(12) United States Patent
Ghannam et al.

(10) Patent No.: US 10,946,825 B2
(45) Date of Patent: Mar. 16, 2021

(54) AIRBAG ASSEMBLY

(71) Applicant: Ford Global Technologies, LLC, Dearborn, MI (US)

(72) Inventors: Mahmoud Yousef Ghannam, Canton, MI (US); Howard E. Churchwell, II, Monroe, MI (US); Swadad A. Carremm, Canton, MI (US); Jayagopal Appukutty, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 16/208,902

(22) Filed: Dec. 4, 2018

(65) Prior Publication Data

US 2020/0172039 A1 Jun. 4, 2020

(51) Int. Cl.
*B60R 21/205* (2011.01)
*B60R 21/203* (2006.01)
*B60R 21/217* (2011.01)
*B60R 21/00* (2006.01)

(52) U.S. Cl.
CPC ........ *B60R 21/205* (2013.01); *B60R 21/2035* (2013.01); *B60R 21/2176* (2013.01); *B60R 2021/0004* (2013.01)

(58) Field of Classification Search
CPC .............. B60R 21/205; B60R 21/2035; B60R 21/2176; B60R 2021/0004; B60R 21/2015; B60R 2021/161
See application file for complete search history.

(56) References Cited

U.S. PATENT DOCUMENTS

| | | | | |
|---|---|---|---|---|
| 4,773,673 A * | 9/1988 | Sakurai | ................. | B60R 21/215 |
| | | | | 280/728.3 |
| 5,971,431 A * | 10/1999 | Wohllebe | .............. | B60R 21/206 |
| | | | | 280/728.3 |
| 6,053,527 A * | 4/2000 | Gans | ..................... | B60R 21/215 |
| | | | | 280/728.1 |
| 6,270,112 B1 * | 8/2001 | Bowers | .................. | B60R 21/02 |
| | | | | 280/728.3 |
| 6,547,272 B1 | 4/2003 | Klozik et al. | | |
| 6,951,348 B2 | 10/2005 | Enders | | |
| 7,540,531 B2 * | 6/2009 | Sakakibara | ........... | B60R 21/206 |
| | | | | 280/728.3 |
| 7,594,674 B1 * | 9/2009 | Biondo | ................ | B60R 21/206 |
| | | | | 280/728.3 |

(Continued)

FOREIGN PATENT DOCUMENTS

DE 3934588 C2 10/1989
WO WO-2019104283 A1 * 5/2019 ........... B60R 21/203

OTHER PUBLICATIONS

D, Schneider, WO 2019/104283 Machine English Translation, ip.com (Year: 2019).*

*Primary Examiner* — Karen Beck
(74) *Attorney, Agent, or Firm* — Frank A. MacKenzie; Bejin Bieneman PLC

(57) ABSTRACT

An assembly includes a front console. The assembly includes a body having a reaction surface and supported by the front console. The assembly includes an actuator connected to the body, the body movable by the actuator to a deployed position. The assembly includes an airbag supported by the front console and inflatable to an inflated position that abuts the reaction surface. The assembly includes an inflator connected to the airbag.

14 Claims, 16 Drawing Sheets

(56) References Cited

U.S. PATENT DOCUMENTS

| | | | |
|---|---|---|---|
| 7,828,323 B1 | 11/2010 | Mazzocchi et al. | |
| 8,931,800 B2 | 1/2015 | Fukawatase et al. | |
| 9,487,177 B2* | 11/2016 | Schneider | B60R 21/231 |
| 10,507,783 B2* | 12/2019 | Rupp | B60R 21/239 |
| 2003/0107209 A1* | 6/2003 | Haig | B60R 21/08 |
| | | | 280/749 |
| 2004/0074688 A1* | 4/2004 | Hashimoto | B60R 21/36 |
| | | | 180/271 |
| 2004/0251668 A1* | 12/2004 | Schneider | B60R 21/237 |
| | | | 280/743.1 |
| 2005/0029781 A1* | 2/2005 | Enders | B60R 21/205 |
| | | | 280/732 |
| 2005/0040667 A1* | 2/2005 | Schneider | B60R 21/214 |
| | | | 296/97.12 |
| 2005/0161921 A1* | 7/2005 | Higuchi | B60N 2/986 |
| | | | 280/735 |
| 2007/0024036 A1* | 2/2007 | Song | B60R 21/2165 |
| | | | 280/732 |
| 2007/0210565 A1* | 9/2007 | Song | B60R 21/2165 |
| | | | 280/732 |
| 2008/0136144 A1 | 6/2008 | Spahr et al. | |
| 2009/0115176 A1* | 5/2009 | Reiter | B60R 21/233 |
| | | | 280/743.2 |
| 2013/0001937 A1* | 1/2013 | Yamada | B60R 21/205 |
| | | | 280/732 |
| 2016/0250988 A1* | 9/2016 | Weng | B60R 21/215 |
| | | | 280/743.1 |
| 2017/0259772 A1 | 9/2017 | Farooq et al. | |
| 2018/0272983 A1* | 9/2018 | Mazzocchi | B60R 21/2165 |
| 2019/0077357 A1* | 3/2019 | Rupp | B60R 21/231 |
| 2019/0135220 A1* | 5/2019 | Rupp | B60R 21/237 |
| 2020/0001815 A1* | 1/2020 | Minakawa | B62D 1/04 |
| 2020/0017052 A1* | 1/2020 | Deng | B60R 21/055 |
| 2020/0094766 A1* | 3/2020 | Malapati | B60R 21/264 |
| 2020/0398779 A1* | 12/2020 | Malapati | B60R 21/026 |

* cited by examiner

AIRBAG ASSEMBLY

BACKGROUND

A vehicle may include one or more airbags deployable during a vehicle impact to control kinematics of objects inside the vehicle. The airbag may be a component of an airbag assembly including a housing supporting the airbag, and an inflation device in communication with the airbag for inflating the airbag from an uninflated position to an inflated position.

DETAILED DESCRIPTION

Figure 1:
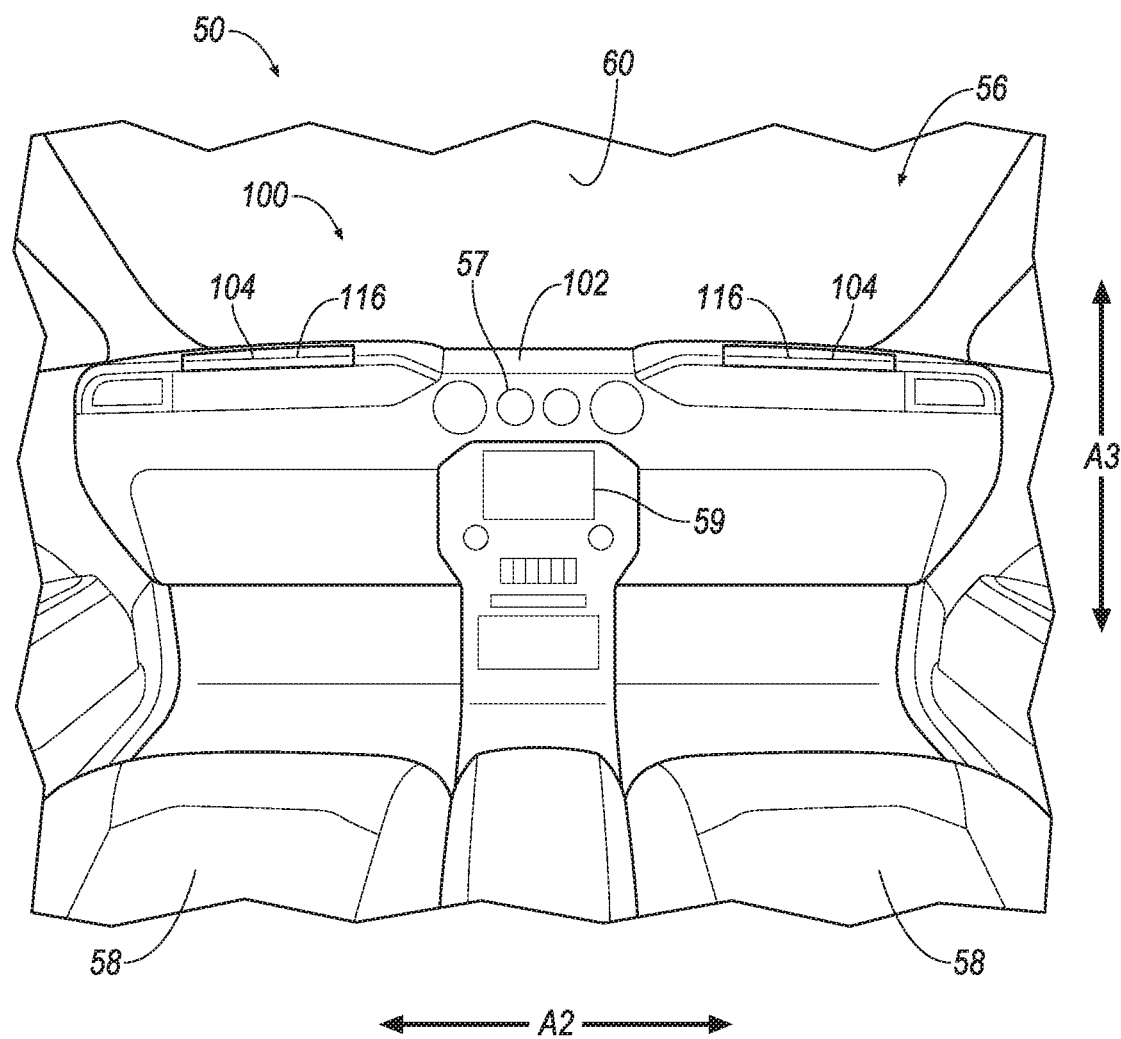
FIG. 1 is a forward view of a passenger cabin of a vehicle having an example airbag assembly.
Figure 2:
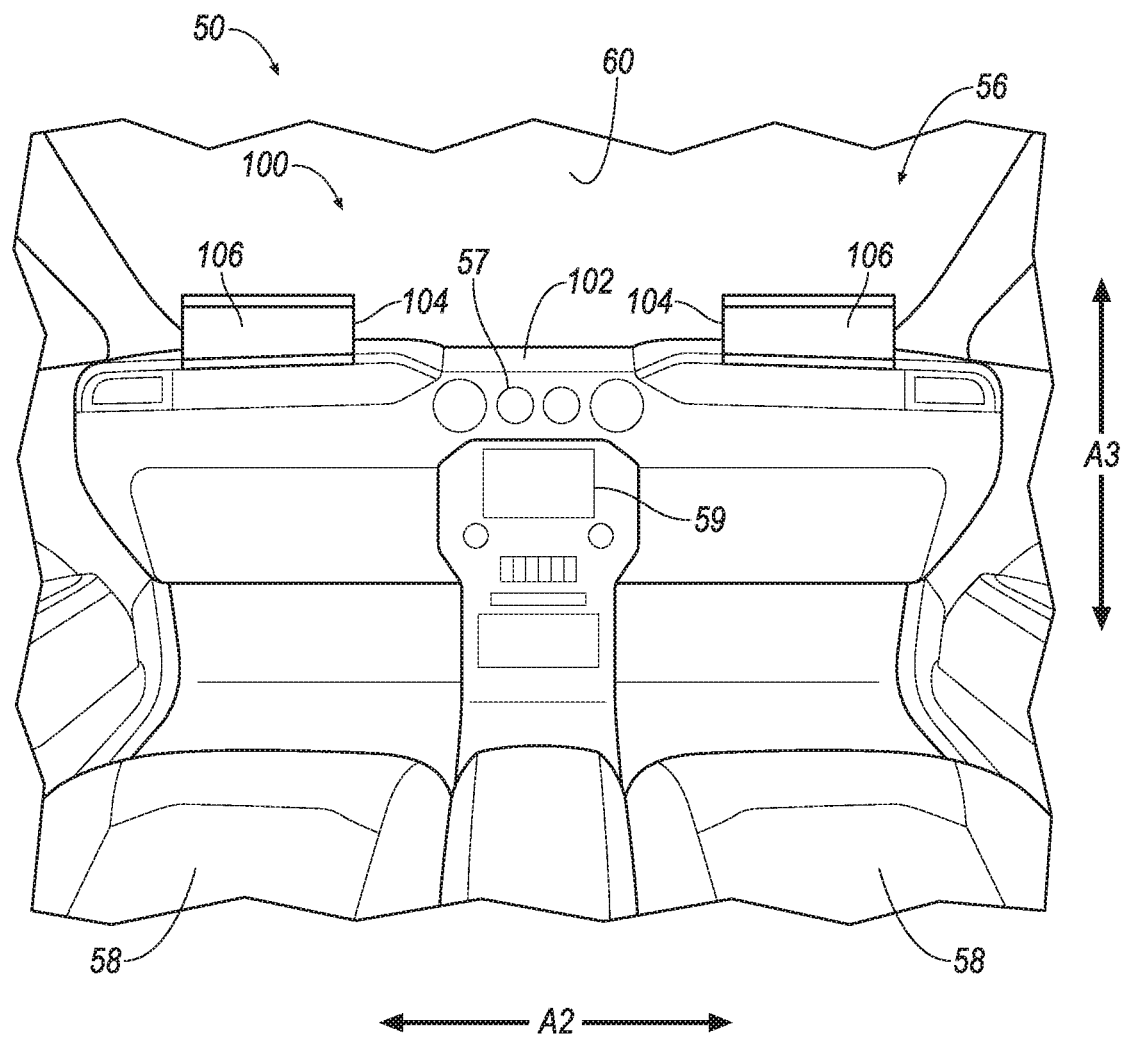
FIG. 2 is a forward view of the passenger cabin with a body of the example airbag assembly in a deployed position.
Figure 3:
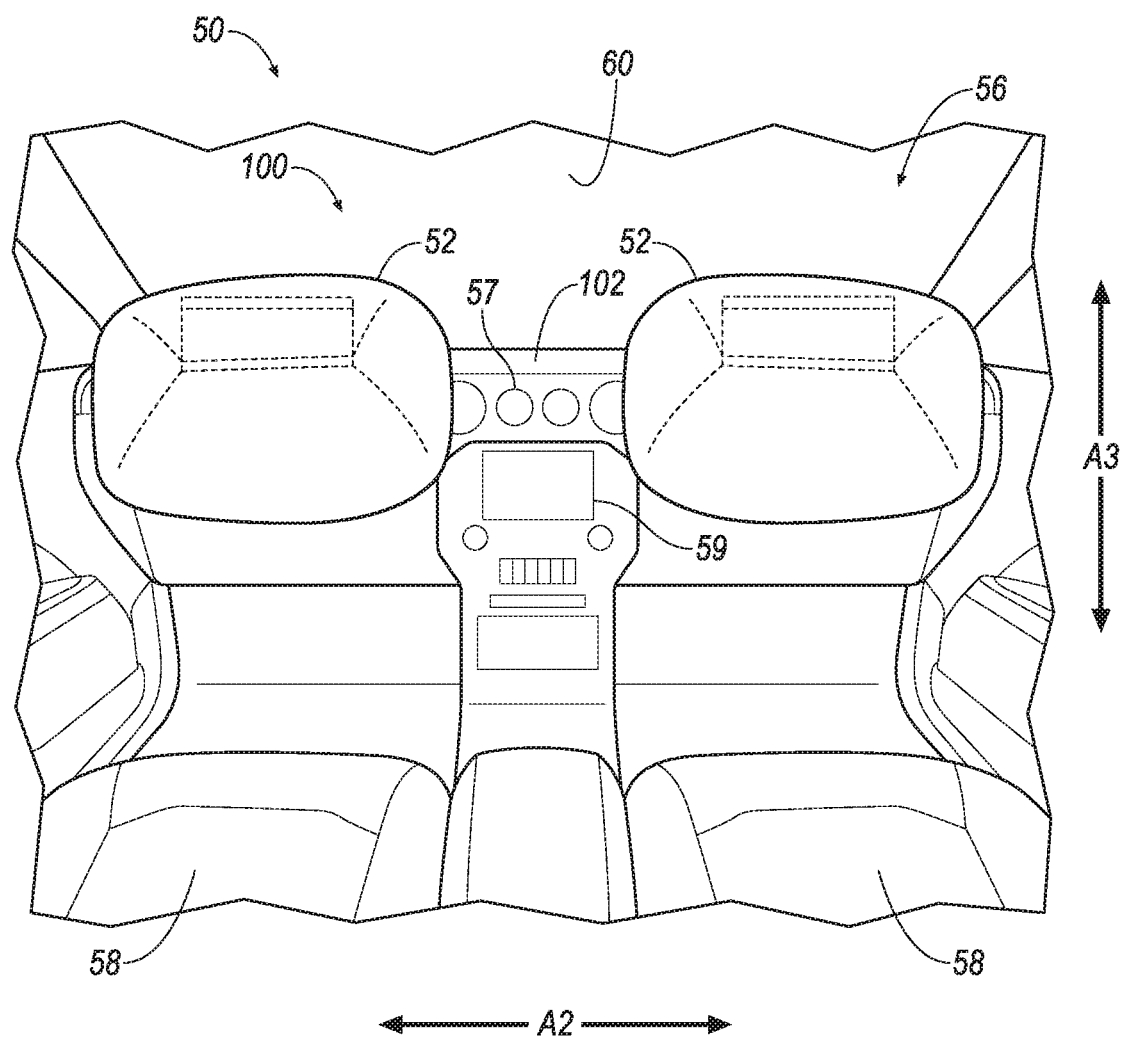
FIG. 3 is a forward view of the passenger cabin with the body of the example airbag assembly in the deployed position and an airbag in an inflated position.
Figure 4:
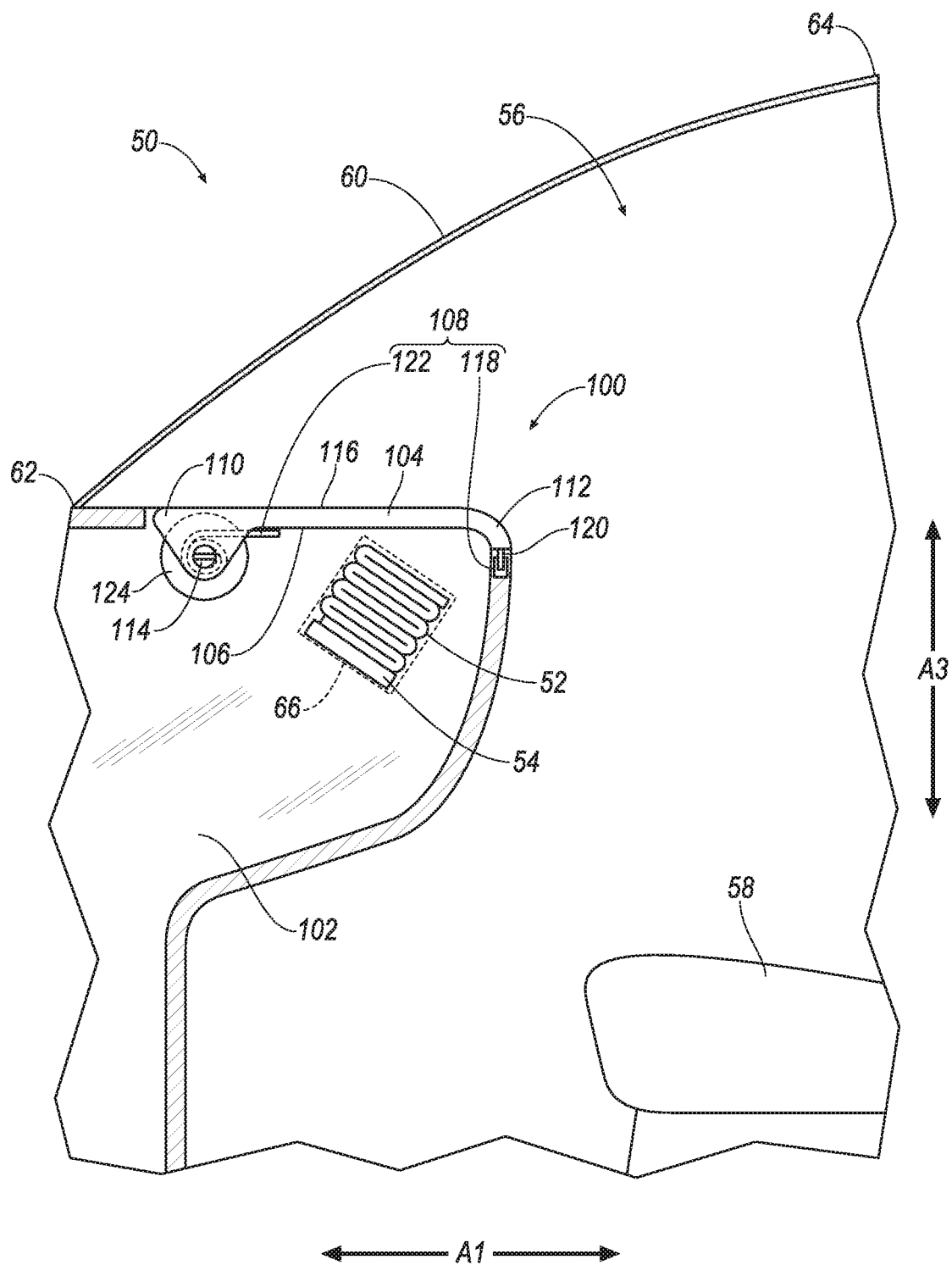
FIG. 4 is a side cross section of the passenger cabin with the body of the example airbag assembly in an undeployed position.
Figure 5:
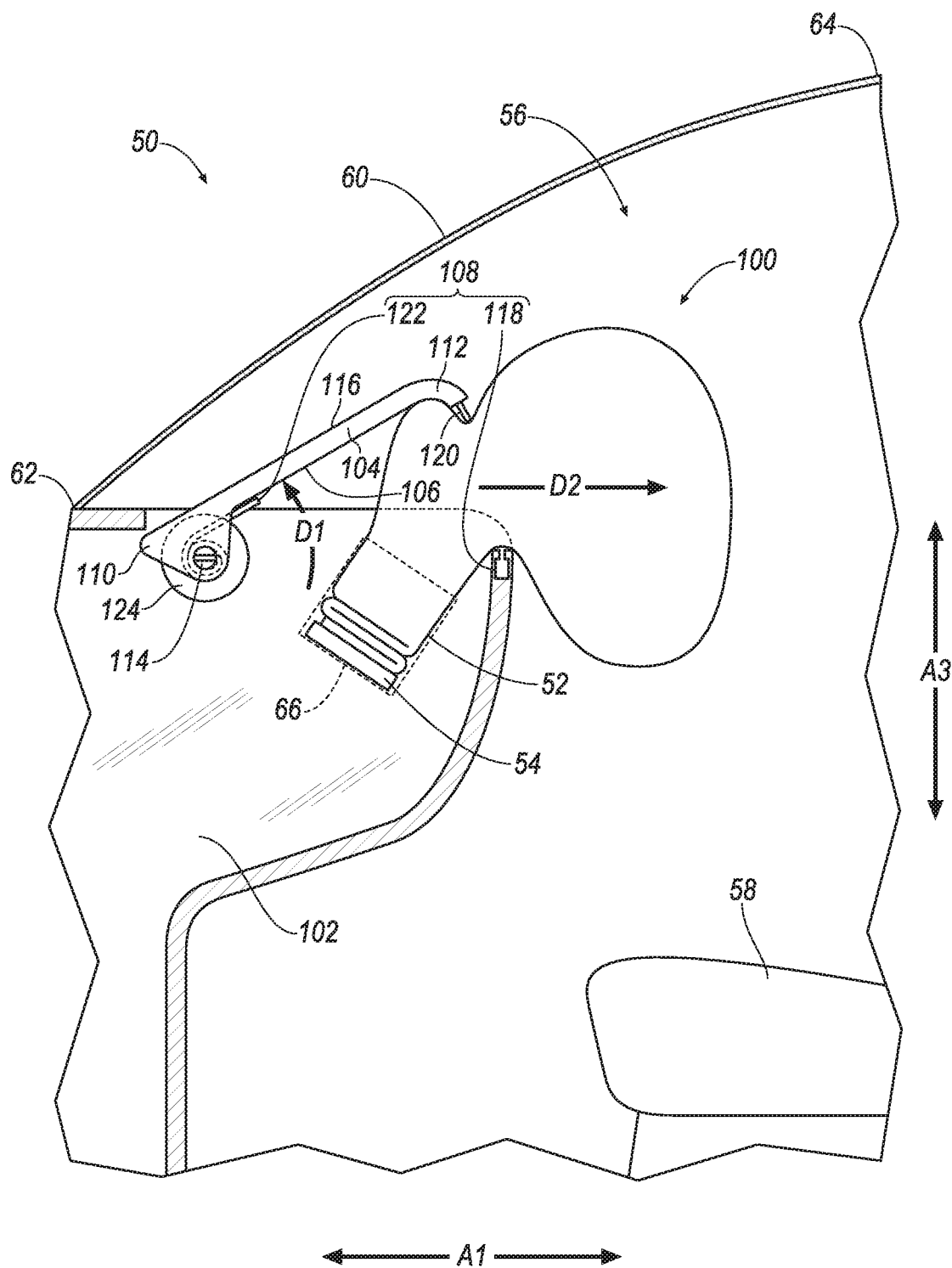
FIG. 5 is a side cross section of the passenger cabin with the body of the example airbag assembly in a first deployed position and the airbag in the inflated position.

An assembly includes a front console. The assembly includes a body having a reaction surface and supported by the front console. The assembly includes an actuator connected to the body, the body movable by the actuator to a deployed position. The assembly includes an airbag supported by the front console and inflatable to an inflated position that abuts the reaction surface. The assembly includes an inflator connected to the airbag.

The body may be rotatable from an undeployed position to the deployed position.

The body may be translatable from an undeployed position to the deployed position.

The actuator may be a linear actuator.

The actuator may be a pyrotechnic device.

The actuator may include a latch engaged with the body and a spring urging the body to the deployed position.

The assembly may include a second actuator connected to the body, the body movable by the second actuator to a second deployed position.

The body may be movable by the actuator to a second deployed position.

The body may be moveable to the deployed position in a first direction, and the airbag may be inflatable in a second direction transverse to the first direction.

The assembly may include a second body supported by the front console and moveable to a deployed position, and a second actuator connected to the second body to move the second body to the deployed position.

A vehicle includes a windshield and a front console. The vehicle includes an airbag supported by the front console and inflatable to an inflated position. The vehicle includes an inflator connected to the airbag. The vehicle includes a body supported by the front console. The vehicle includes an actuator connected to the body, the body moveable by the actuator to a deployed position between the windshield and the airbag in the inflated position.

The vehicle may include a processor and a memory storing instructions executable by the processor to move the body to the deployed position upon detecting an impact.

The memory may store instructions to inflate the airbag after actuating the actuator.

The memory may store instructions to disengage a latch from the body before actuating the actuator.

The body may be movable from an undeployed position that is further from the windshield than the deployed position.

The body may be movable from an undeployed position that is closer to a front edge the windshield than the deployed position.

The body may include a class-A surface.

The actuator may be a linear actuator.

The body may be rotatable from an undeployed position to the deployed position.

The body may be translatable from an undeployed position to the deployed position.

With reference to the Figures, wherein like numerals indicate like parts throughout the several views, an airbag assembly 100, 200, 300, 400 for a vehicle 50 includes a front console 102, 202, 302, 402. The airbag assembly 100, 200, 300, 400 includes a body 104, 204, 304, 404 having a reaction surface 106, 206, 306, 406. The body 104, 204, 304, 404 is supported by the front console 102, 202, 302, 402. The airbag assembly 100, 200, 300, 400 includes an actuator 108, 208, 308, 408 connected to the body 104, 204, 304, 404. The body 104, 204, 304, 404 is movable by the actuator 108, 208, 308, 408 to a deployed position. The airbag assembly 100, 200, 300, 400 includes an airbag 52 supported by the front console 102, 202, 302, 402 and inflatable to an inflated position that abuts the reaction surface 106, 206, 306, 406. The airbag assembly 100, 200, 300, 400 includes an inflator 54 connected to the airbag 52. The reaction surface 106, 206, 306, 406 of the body 104, 204, 304, 404 in the deployed position directs inflation of the airbag 52 to control kinematic of objects within the vehicle 50.

The vehicle 50 may be any type of passenger or commercial automobile such as a car, a truck, a sport utility vehicle, a crossover vehicle, a van, a minivan, a taxi, a bus, etc. The vehicle 50 defines a vehicle-longitudinal axis A1, i.e., extending between a front and a rear of the vehicle 50. The vehicle 50 defines a cross-vehicle axis A2, i.e., extending between a left side and a right side of the vehicle 50. The vehicle 50 defines a vehicle-vertical axis A3, i.e., extending between a top and a bottom of the vehicle. The vehicle-longitudinal axis A1, the cross-vehicle axis A2, and the vehicle-vertical axis A3 are perpendicular to each other. The top, bottom, front, rear, left and right sides, and relative directions used herein (such forward, rearward, upward, downward, etc.) may be relative to an orientation of an occupant of the vehicle. The top, bottom, front, rear, left and right sides, and relative directions used herein may be relative to an orientation of controls for operating the vehicle, e.g., an instrument panel. The top, bottom, front, rear, left and right sides, and relative directions used herein may be relative to a driving direction of the vehicle 50 when wheels of the vehicle 50 are all parallel with each other.

The vehicle 50 includes a passenger cabin 56. The passenger cabin 56 includes one or more seats 58. The seats 58 are shown as bucket seats, but the seats 58 may be other types. The seats 58 may face the front console 102, 202, 302, 402. In other words, a seat bottom of the seat 58 may extend from a seatback of the seat 58 toward the front console 102, 202, 302, 402.

The front console 102, 202, 302, 402 is disposed at a forward end of the passenger cabin 56 and faces toward the seats 58. The front console 102, 202, 302, 402 may be elongated along the cross-vehicle axis A2. For example, the front console 102, 202, 302, 402 may be an instrument panel that includes one or more instruments 57 such as gauges, displays, etc. The front console 102, 202, 302, 402 may include vehicle controls 59, such as a steering wheel, a touch screen interface, button, nobs, switches, etc.

A windshield 60 extends upwardly from the front console 102, 202, 302, 402. Specifically, the windshield 60 may extend from the front console 102, 202, 302, 402 to a roof. The windshield 60 protects objects in the passenger cabin 56 of the vehicle 50, e.g., from the elements and debris. The windshield 60 is transparent, e.g., such that occupants of the vehicle 50 may see therethrough. The windshield 60 may be at the forward end of the passenger cabin 56. The windshield 60 may include a front edge 62 and a rear edge 64. The front edge 62 is forward of the rear edge 64. In other words, the rear edge 64 may be between the front edge 62 and the seats 58 relative to the vehicle-longitudinal axis A1.

The airbag 52 may be formed of a woven polymer or any other material. As one example, the airbag 52 28 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 52 is supported by the front console 102, 202, 302, 402, e.g., via a housing 66. The housing 66 houses the airbag 52 in an uninflated position, shown in FIGS. 4, 7, 10, and 12, and supports the airbag 52 in the inflated position, shown in FIGS. 5, 6, 8, 9, 11, 13, and 14. The airbag 52 may be rolled and/or folded to fit within the housing 66 in the uninflated position. The housing 66 may be of any suitable material, e.g., a rigid polymer, a metal, a composite, or a combination of rigid materials. The housing 66 may be supported by the front console 102, 202, 302, 402.

The inflator 54 may be connected to the airbag 52, e.g., via tubing or other structure to transfer inflation medium from the inflator 54 to the airbag 52. Upon receiving an instruction, such as an electrical pulse, from, e.g., a computer 68, the inflator 54 may inflate the airbag 52 with an inflatable medium, such as a gas, to the inflated position. The inflator 54 may be, for example, a pyrotechnic inflator that uses a chemical reaction to drive inflation medium to the airbag 52. The inflator 54 may be of any suitable type, for example, a cold-gas inflator. The inflator 54 may be supported by the housing 66 or at any other suitable vehicle location. Inflation of the airbag 52 may tear, separate, or otherwise deform the front console 102, 202, 302, 402.

The body 104, 204, 304, 404 is moveable from an undeployed position, shown in FIGS. 1, 4, 7, 10, and 12, to one or more deployed positions, shown in FIGS. 2, 3, 5, 6, 8, 9, 11, 13, and 14. The body 104, 204, 304, 404 in one of the deployed positions is between the windshield 60 and the airbag 52 in the inflated position. The reaction surface 106, 206, 306, 406 of the body 104, 204, 304, 404 in one of the deployed positions may face generally rearward, e.g., toward one of the seats 58, etc.

The body 104, 204, 304, 404 controls inflation of the airbag 52. For example, the reaction surface 106, 206, 306, 406 of the body 104, 204, 304, 404 in the deployed positions may abut the airbag 52 in the inflated position, limiting movement of the airbag 52 toward the windshield 60 and positioning the airbag 52 relative to the front console 102, 202, 302, 402, the seat 58, etc. The body 104, 204, 304, 404 is supported by the front console 102, 202, 302, 402, e.g., as described below. The body 104, 204, 304, 404 may include a front end 110, 210, 310, 410 and a rear end 112, 212, 312, 412, e.g. relative to the vehicle-longitudinal axis A1. In other words, the front end 110, 210, 310, 410 of the body 104, 204, 304, 404 in the undeployed position may be between the windshield 60 and the rear end 112, 212, 312, 412, and the rear end 112, 212, 312, 412 may be between the front end 110, 210, 310, 410 and the seats 58. The body 104, 204, 304, 404 may be plastic, or any suitable material.

The body 104, 204, 304, 404 is movable to the deployed positions in a first direction D1, and the airbag 52 is inflatable to the inflated position in a second direction D2 that is transverse to the first direction D1. In other words, the direction D2 of the airbag 52 during deployment is different than the direction D1 the body 104, 204, 304, 404 moves from the undeployed position to the deployed positions. For example, the first direction D1 may be generally upward, and the second direction D2 may be generally rearward. As another example, the first direction D1 may be toward a roof of the vehicle 50, and the second direction D2 may be toward one of the seats 58. The second direction D2 may be in part defined by the body 104, 204, 304, 404. For example, reaction forces between the airbag 52 and the reaction surface 106, 206, 306, 406 may urge the airbag 52 to inflate transverse to the reaction surface 106, 206, 306, 406. The adjectives "first," "second," etc., are used throughout this document as identifiers and are not intended to signify importance or order.

The actuator 108, 208, 308, 408 is designed to move the body 104, 204, 304, 404 to one or more of the deployed positions. The actuator 108, 208, 308, 408 generates force, e.g., torque, linear force, etc., e.g., in response to an instruction from the computer 68. The actuator 108, 208, 308, 408 is connected to the body 104, 204, 304, 404 to transfer such force to the body 104, 204, 304, 404, e.g., as described below. The actuator 108, 208, 308, 408 may be a chemical, mechanical, electro-mechanical, pneumatic, hydraulic, and/or magnetic device.

The vehicle 50 and/or airbag assembly 100, 200, 300, 400 may include a second body 104, 204, 304, 404, a second actuator 108, 208, 308, 408, a second airbag 52, and a second inflator 54. The second body 104, 204, 304, 404 may by supported by the front console 102, 202, 302, 402 and may by moveable to a deployed position. The second actuator 108, 208, 308, 408 may be connected to the second body 104, 204, 304, 404 to move the second body 104, 204, 304, 404 the deployed position. The body 104, 204, 304, 404, actuator 108, 208, 308, 408, etc., may be at an opposite end of the front console 102, 202, 302, 402 than the second body 104, 204, 304, 404, the second actuator 108, 208, 308, 408, etc. For example, the body 104, 204, 304, 404, actuator 108, 208, 308, 408, etc., may be at the right side of the vehicle 50 and the second body 104, 204, 304, 404, the second actuator 108, 208, 308, 408, etc., may be at the left side of the vehicle 50.

Figure 6:
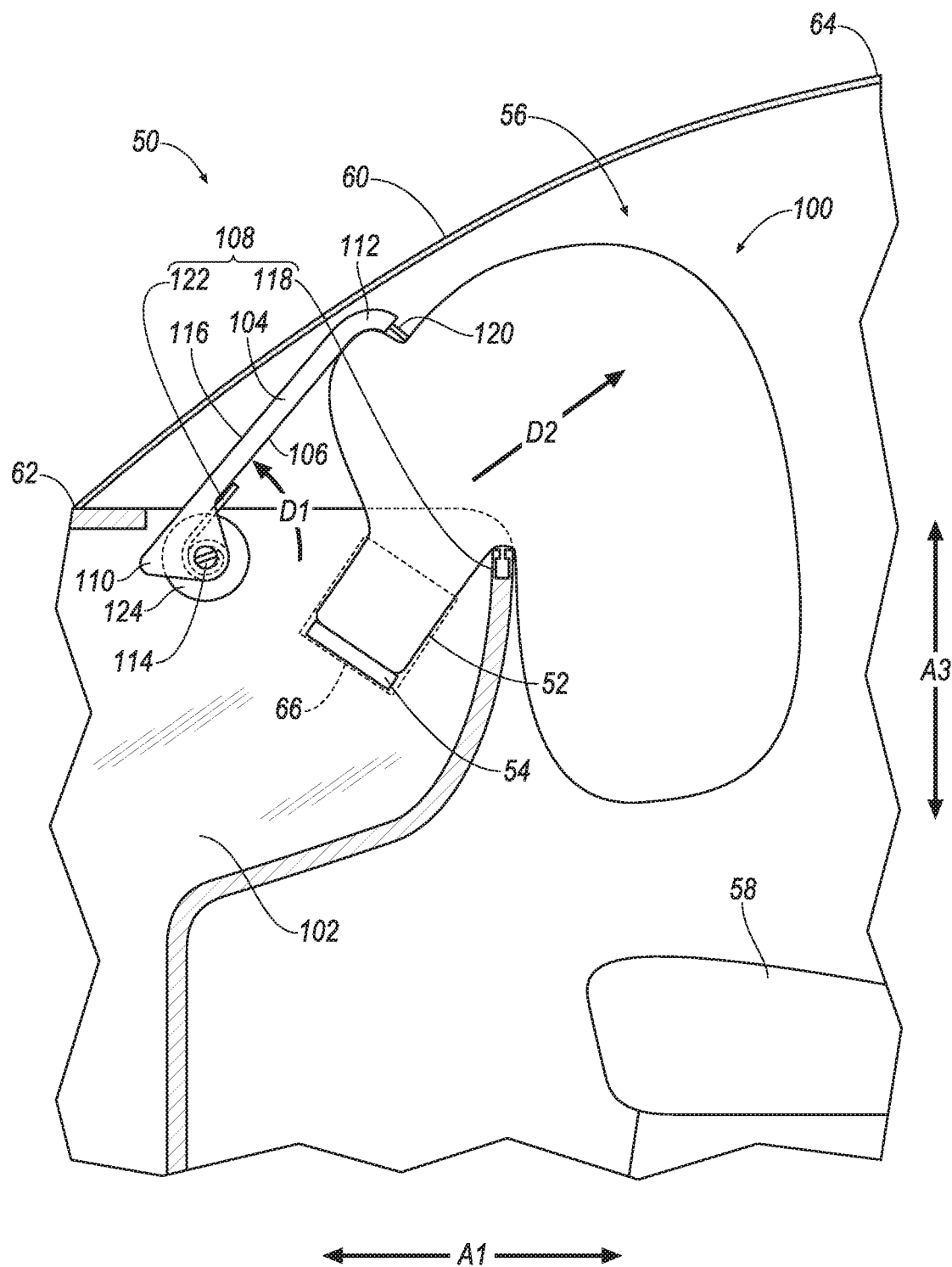
FIG. 6 is a side cross section of the passenger cabin with the body of the example airbag assembly in a second deployed position and the airbag in the inflated position.

With reference now to the example airbag assembly 100 shown in FIGS. 1-6, the body 104 may be rotatably supported by the front console 102 e.g., to rotate between the undeployed position, a first deployed position (shown in FIG. 5), and a second deployed position (shown in FIG. 6). For example, a rod 114 may be received by an opening of the front console 102 and an opening of the body 104, e.g., providing a hinge. The rod 114 may be elongated along the cross-vehicle axis A2. The rod 114 may be at a front of the body 104. For example, the rod 114 may be closer to the front end 110 than the rear end 112. Other rotation enabling structures may be used.

The body 104 may include a top surface 116 that faces generally upwardly when the body 104 is in the undeployed position. The top surface 116 may be opposite the reaction surface 106 on the body 104. The top surface 116 may be a class-A surface, i.e., a surface specifically manufactured to have a high-quality, finished aesthetic appearance free of blemishes.

The actuator 108 includes a latch 118. The latch 118 may be engaged and disengaged with the body 104. For example, the latch 118 may engage and disengage a latch plate 120 or other suitable engaging structure of the body 104. The latch 118 is moveable to an engaged position in which movement of the body 104 is restricted. The latch 118 is moveable to a disengaged position in which movement of the body 104 is permitted. The latch 118 may actuate to the engaged position or the disengaged position in response to receiving an instruction from the computer 68. For example, the latch 118 may include circuits chips, an electromechanical actuator, etc., configured to move the latch 118 from being engaged to disengaged. The latch 118 may be at a rear of the body 104, i.e., closer to the rear end 112 of the body 104 than the front end 110. For example, the latch 118 may be supported by a panel of the front console 102 closest to the seats 58 relative to the vehicle-longitudinal axis A1. As another example, the latch 118 may be supported above a glove box compartment, e.g., above a door that permits and restricts access to such compartment.

The actuator 108 includes a spring 122. The spring 122 may be a coil spring, a torsion spring, a compression spring, a V-spring, a gas spring, etc. The spring 122 is designed to urge the body 104 to the deployed position. For example, the spring 122 may be a torsion spring having one end fixed relative to the rod 114 and another end fixed to the body 104. Rotation of the body 104 relative to the rod 114 increases or decreases mechanical energy stored by the spring 122, e.g., depending on a direction of such relative rotation.

The airbag assembly 100 may include another actuator 124. The actuator 124 may be a motor, a servo, or other device that generates torque in response to an instruction from the computer 68. The actuator 124 may be supported by the front console 102, e.g., such that movement of the actuator 124 relative to the front console 102 is restricted. The actuator 124 may be connected to the rod 114 such that torque generated by the actuator 124 is transferred to the rod 114. For example, the actuator 124 may include a rotatable shaft fixed to the rod 114, connected to the rod 114 via gears, etc.

The actuator 124 is connected to the body 104 such that torque generated by the actuator 124 is transferred to the body 104. For example, the actuator 124 may be connected to the body 104 via the rod 114 and the spring 122. Torque generated by the actuator 124 may be transmitted to the rod 114, from the rod 114 the torque may be transmitted to the spring 122, and from the spring 122 the torque may be transmitted to the body 104.

The body 104 is moveable from the undeployed position to the first deployed position and to the second deployed position. The body 104 is rotatable from the undeployed position to the first deployed position and the second deployed position. For example, the spring 122 may urge the body 104 to rotate about the rod 114 and from the undeployed position to the first deployed position when the latch 118 is actuated to the disengaged position. As another example the body 104 is rotatable to the second deployed position when the actuator 124 is actuated to provide torque. The body 104 may be rotated, e.g., by an occupant of the vehicle 50, from the first deployed position or the second deployed position to the undeployed position where the latch 118 may be engaged with the body 104.

Figure 7:
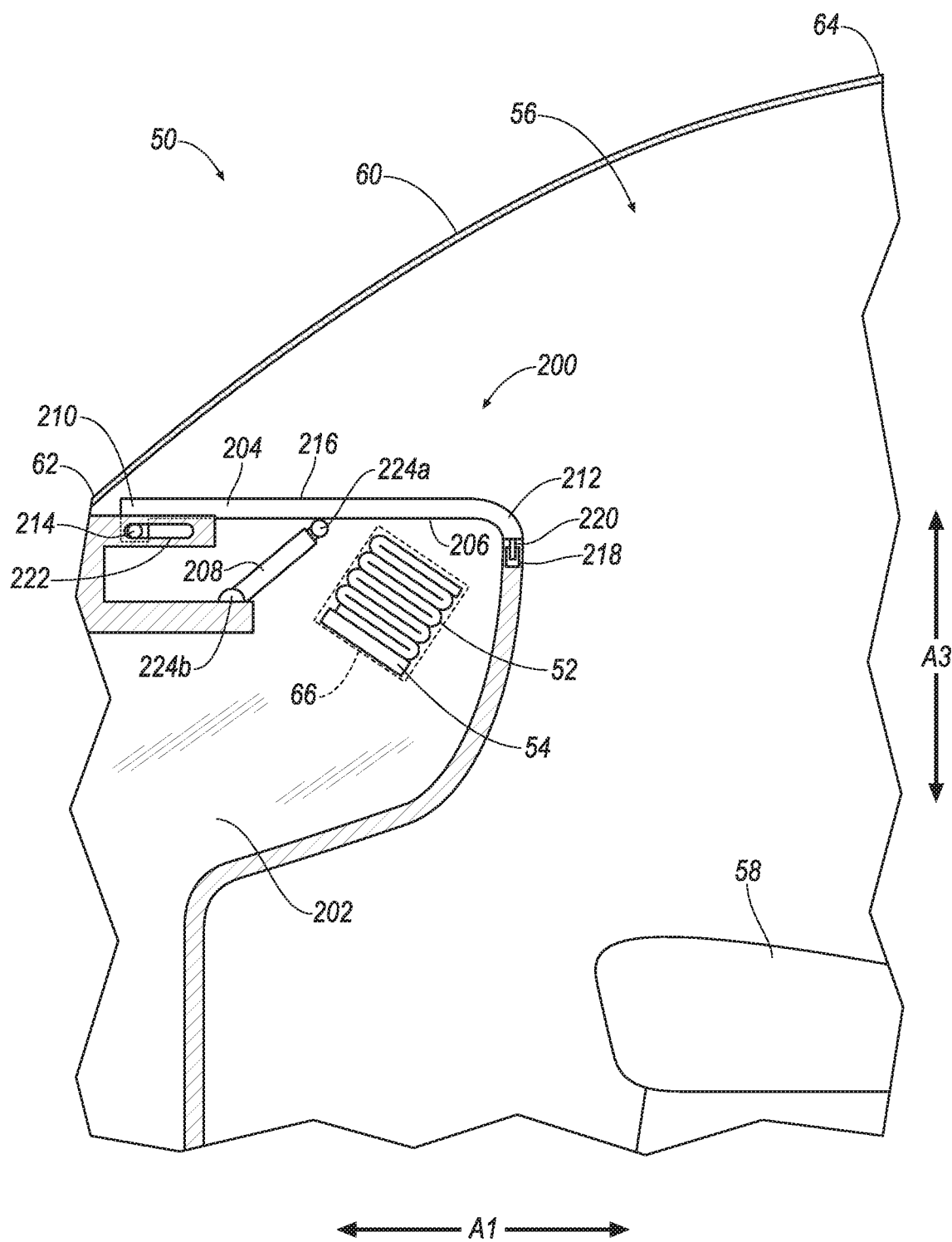
FIG. 7 is a side cross section of the passenger cabin with a body of another example airbag assembly in an undeployed position.
Figure 8:
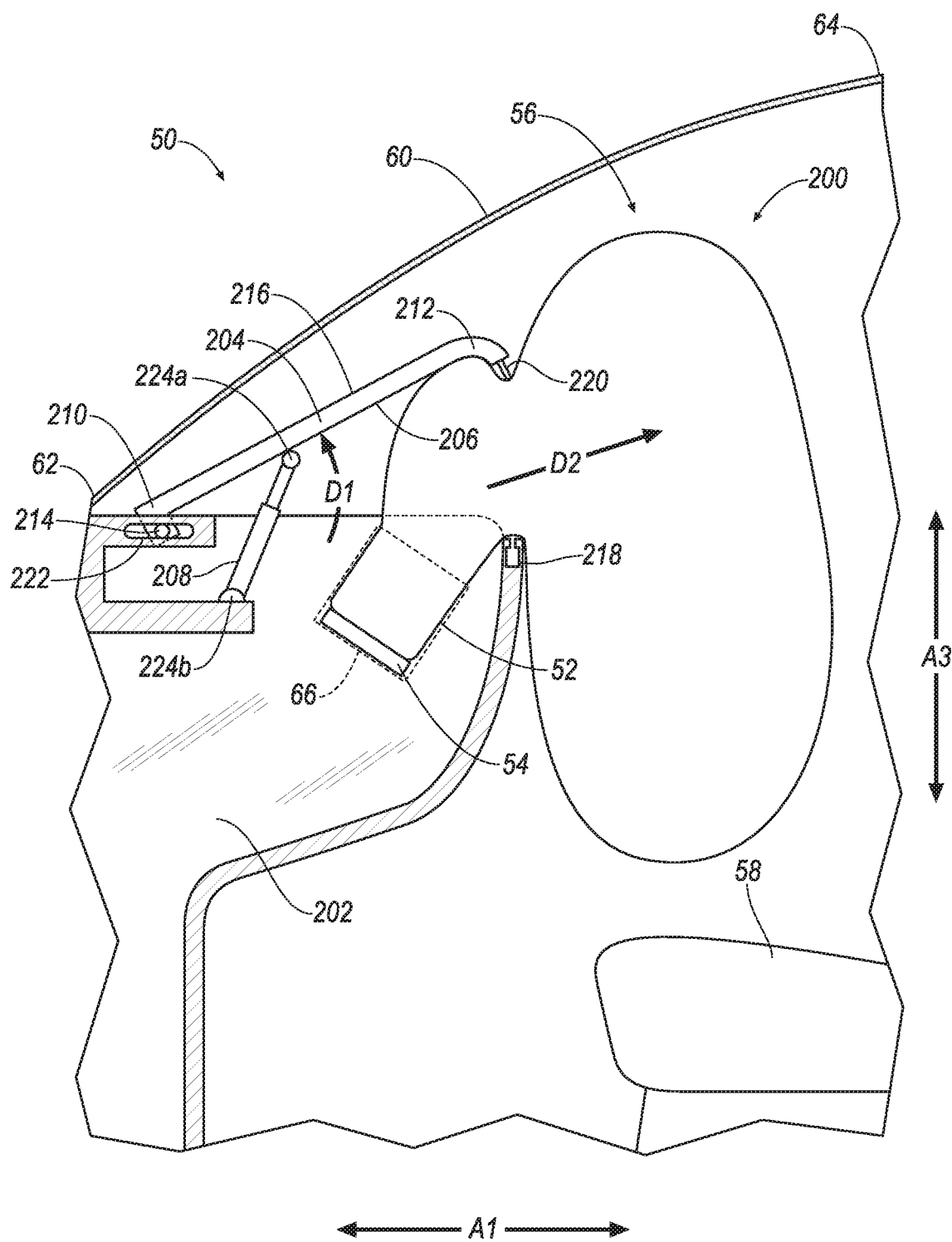
FIG. 8 is a side cross section of the passenger cabin with the body of the example airbag assembly of FIG. 7 in a first deployed position and the airbag in the inflated position.
Figure 9:
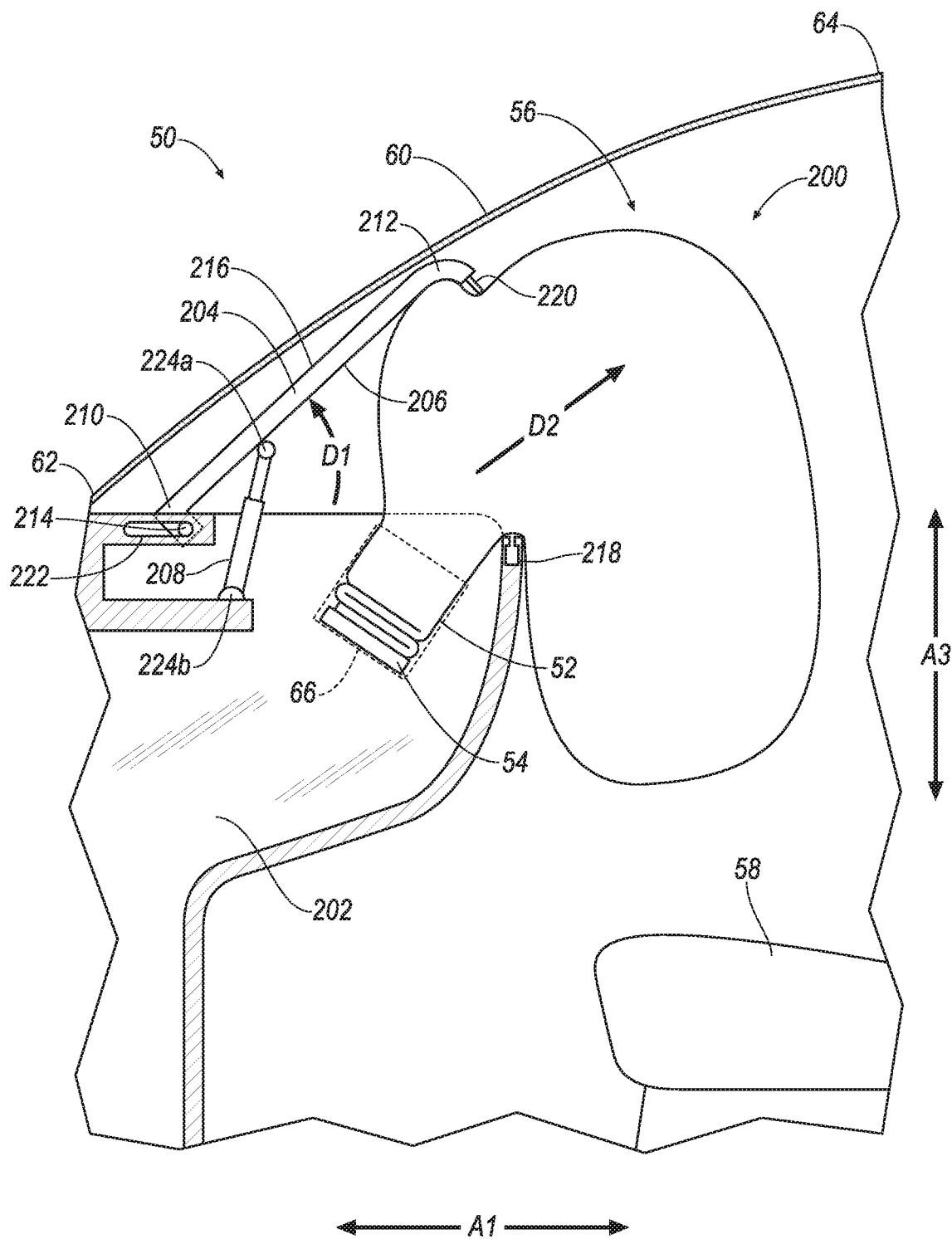
FIG. 9 is a side cross section of the passenger cabin with the body of the example airbag assembly of FIG. 7 in a second deployed position and the airbag in the inflated position.

With reference now to the example airbag assembly 200 shown in FIGS. 7-9, the body 204 may be rotatably and translationally supported by the front console 202 e.g., to rotate and translate between the undeployed position (shown in FIG. 7), the first deployed position (shown in FIG. 8), and the second deployed position (shown in FIG. 9). For example, the body 204 may include a pin 214 that is operatively engaged with a slot 222 of the front console 202. The slot 222 may be elongated along the vehicle-longitudinal axis A1. The pin 214 may translate along the elongation of the slot 222. The pin 214 may rotate within the slot 222 relative to the front console 202. The pin 214 may be at a front of the body 204. For example, the pin 214 may be closer to the front end 210 than the rear end 212. Other translation and rotation enabling structures may be used.

The body 204 may include a top surface 216 and the reaction surface 206, e.g., as described above for the body 104 shown in FIGS. 1-6.

The airbag assembly 200 may include a latch 218 and a latch plate 220 or other suitable engaging structure of the body 204, e.g., as described above for the airbag assembly 100 shown in FIGS. 1-6.

The actuator 208 moves the body 204 between the undeployed position, the first deployed position, and the second deployed position. The actuator 208 may be a linear actuator that increases (by extending) or decreases (by retracting) a distance between ends 224a, 224b, e.g., in response to an instruction from the computer 68. The actuator 208 may be a pyrotechnic actuator, a pneumatic actuator, a piezoelectric actuator, and/or an electromechanical actuator. One end 224b of the actuator 208 may be pivotally attached to the front console 202. The other end 224a of the actuator 208 may be pivotally attached to the body 204. The actuator 208 may convert rotary motion of an electric motor into linear displacement via screws and/or gears, e.g., with leadscrews, screw jacks, ball screws, roller screws, etc. The actuator 208 may utilize hydraulic pressure to move a piston disposed within a hollow cylinder filled with an incompressible fluid. Pressure may be provided to the fluid with a pump. Similarly, the actuator 208 may utilize pneumatic pressure. The actuator 208 may be a pyrotechnic device that includes pyrotechnic material which detonates upon actuation, e.g., upon receipt of a command, such as an electrical pulse, from the computer 68. The pyrotechnic material may be disposed in a cylinder of the actuator 208. Upon detonation, the pyrotechnic material may urge a piston to move relative to the cylinder and increase distance between the ends 224a, 224b of the actuator 208.

The body 204 is rotatable and translatable from the undeployed position to the first deployed position and to the second deployed position. For example, the ends 224a, 224b of the actuator 208 may be a first distance apart when the body 204 is in the undeployed position. The computer 68 may instruct the actuator 208 to extend and have a second distance between the ends 224a, 224b that is greater than the first distance to move the body 204 to the first deployed position. As the body 204 moves to the first deployed position the pin 214 may rotate in the slot 222 and translate rearward along the slot 222. Additionally, the computer 68 may instruct the actuator 208 to further extend and have a third distance between the ends 224a, 224b that is greater than the second distance to move the body 204 to the second deployed position. As the body 204 moves to the second deployed position the pin 214 may further rotate in the slot 222 and further translate rearward along the slot 222. Similarly, the actuator 208 may retract and decrease the distance between the ends 224a, 224b to move the body 204 from the second deployed position to the first deployed position, and from the first deployed position to the undeployed position.

With reference to the airbag system 100, 200 shown in FIGS. 1-9, the body 104, 204 in the undeployed position is further from the windshield 60 than in the deployed positions. For example, the rear end 112, 212 of the body 104, 204, in the first deployed position and the second deployed position may be closer to the windshield 60 relative to the vehicle-longitudinal axis A1 and/or the vehicle-vertical axis A3 than in the undeployed position. Similarly, the body 104, 204 in the first deployed position may be further from the windshield 60 than in the second deployed position.

The body 104, 204 in the first deployed position and the second deployed position controls deployment of the airbag 52, e.g., by varying a location of the reaction surface 106, 206. For example, the reaction surface 106, 206 of the body 104, 204 in the first deployed position directs deployment of the airbag 52 lower than the reaction surface 106, 206 of the body 104, 204 in the second deployed position relative to the vehicle-vertical axis A3. As another example, the reaction surface 106, 206 of the body 104, 204 in the first deployed position positions the airbag 52 closer to the seat 58 than the reaction surface 106, 206 of the body 104, 204 in the second deployed position. Controlling deployment of the airbag 52 with the body 104, 204 in the first deployed position and second deployed position enables the airbag assembly 100, 200 to control kinematics of various sized objects on the seat 58. For example, the body 104, 204 in the first deployed position may direct deployment of the airbag 52 to achieve better results (as compared to airbag 52 deployment directed by the body 104, 204 in the second deployed position) for a crash test using a Hybrid III 5th percentile female dummy. The body 104, 204 in the second deployed position may direct deployment of the airbag 52 to achieve better results (as compared to airbag 52 deployment directed by the body 104, 204 in the first deployed position) for a crash test using a Hybrid III 95th percentile male dummy.

Figure 10:
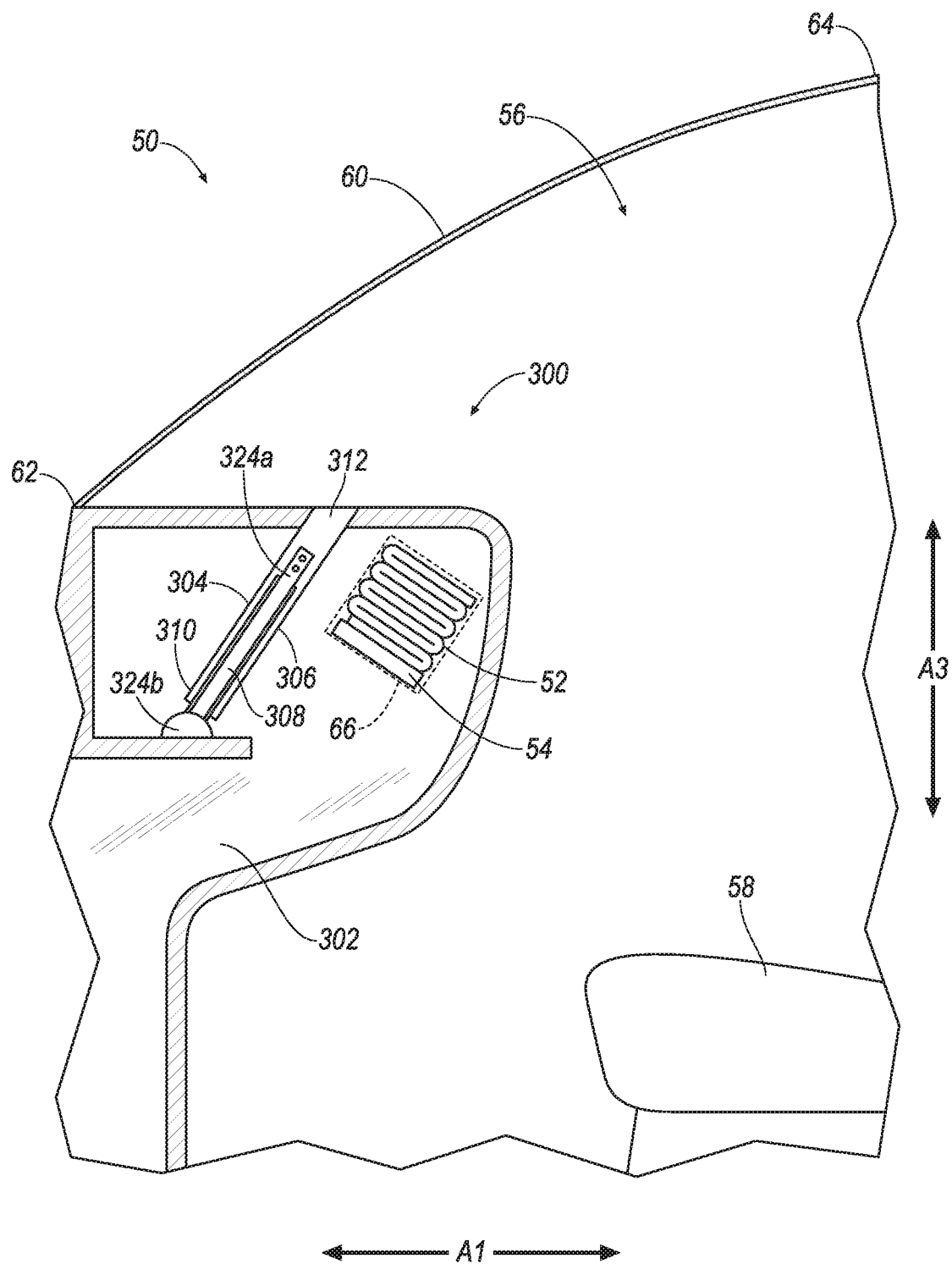
FIG. 10 is a side cross section of the passenger cabin with a body of another example airbag assembly in an undeployed position.
Figure 11:
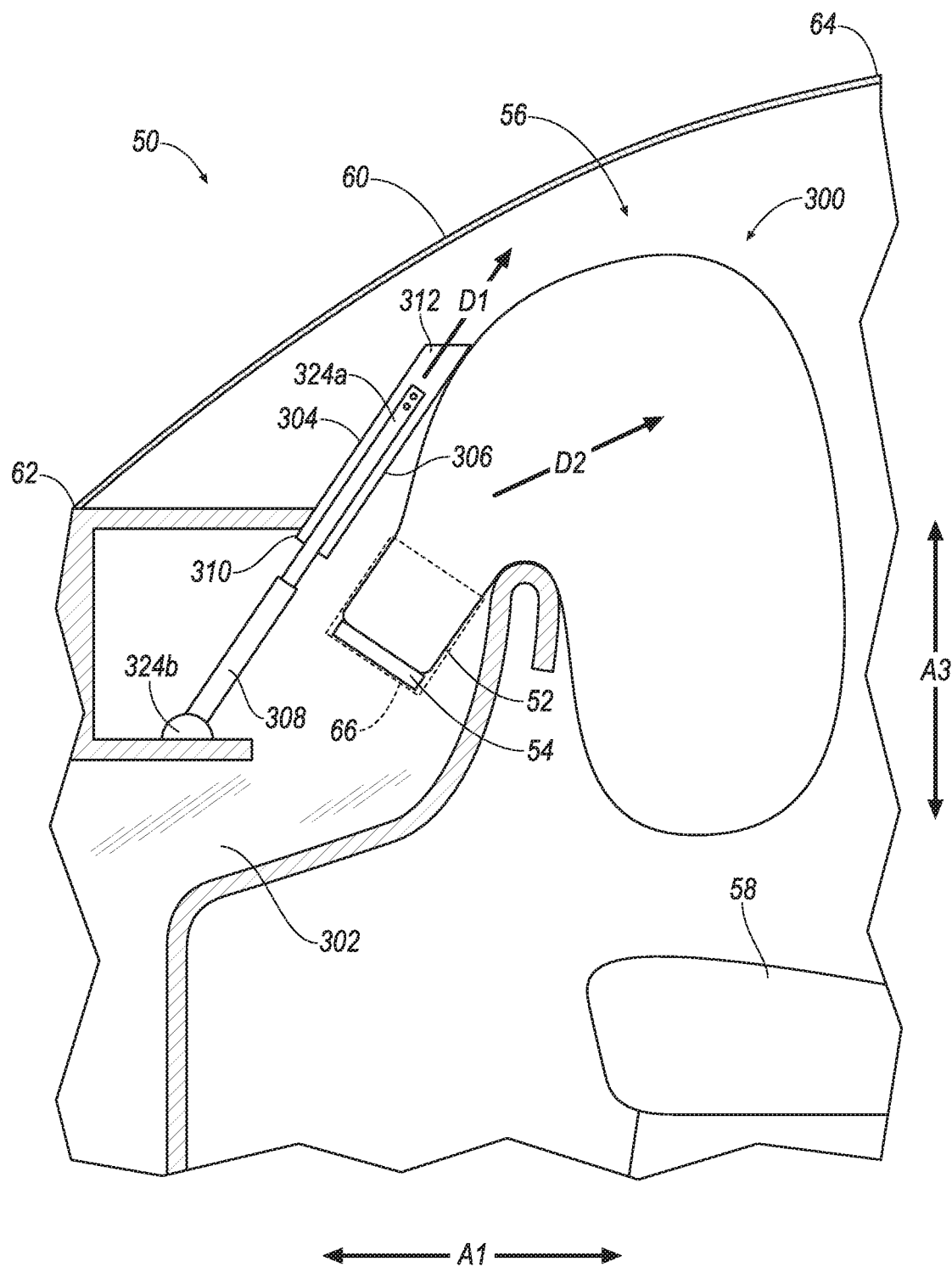
FIG. 11 is a side cross section of the passenger cabin with the body of the example airbag assembly of FIG. 10 in a deployed position and the airbag in the inflated position.

With reference now the example airbag assembly 300 shown in FIGS. 10 and 11, the body 304 may be translationally supported by the front console 302, e.g., such that the body 304 may translate relative to the front console 302 between the undeployed position (shown in FIG. 10) and the deployed position (shown in FIG. 11). For example, the body 304 may be supported by the front console 302 via a track, rollers, tongue and groove, or other suitable structure that permits linear movement of the body 304 relative to the front console 302 and restricts other movement of the body 304 relative to the front console 302. As another example, the body 304 may be fixed relative to one end 324a of the actuator 308 to inhibit relative movement therebetween. When the body 304 is fixed relative to one end 324a of the actuator 308 the body 304 translates as the actuator 308 extends or retracts, e.g., in response to an instruction from the computer 68.

The actuator 308 may be a linear actuator as described above for the actuator 208 in the example airbag assembly 200. The actuator 308 may be a pyrotechnic device, again as described above for the actuator 208 in the example airbag assembly 200. The actuator 308 may be supported by the front console 302. For example, another end 324b of the actuator 308 may be connected to the front console 302, e.g., via fastener or other mechanical attachment.

The body 304 is translatable from the undeployed position to the deployed position. For example, the body 304 may translate relative to the front console 302 as the actuator 308 extends or retracts. In other words, linear movement of the actuator 308 may translate the body 304 from the undeployed position to the deployed position, and vice versa.

The body 304 in the deployed position controls deployment of the airbag 52. For example, in the deployed position the reaction surface 306 of the body 304 may be exposed, e.g., outside of the front console 302. The reaction surface 306 in the deployed position may be between the windshield 60 and the seat 58, e.g., positioning the airbag 52 in the inflated position closer to the seat 58 than if the windshield 60 functioned as a reaction surface for the airbag 52. The reaction surface 306 may extend parallel to the first direction D1.

Figure 12:
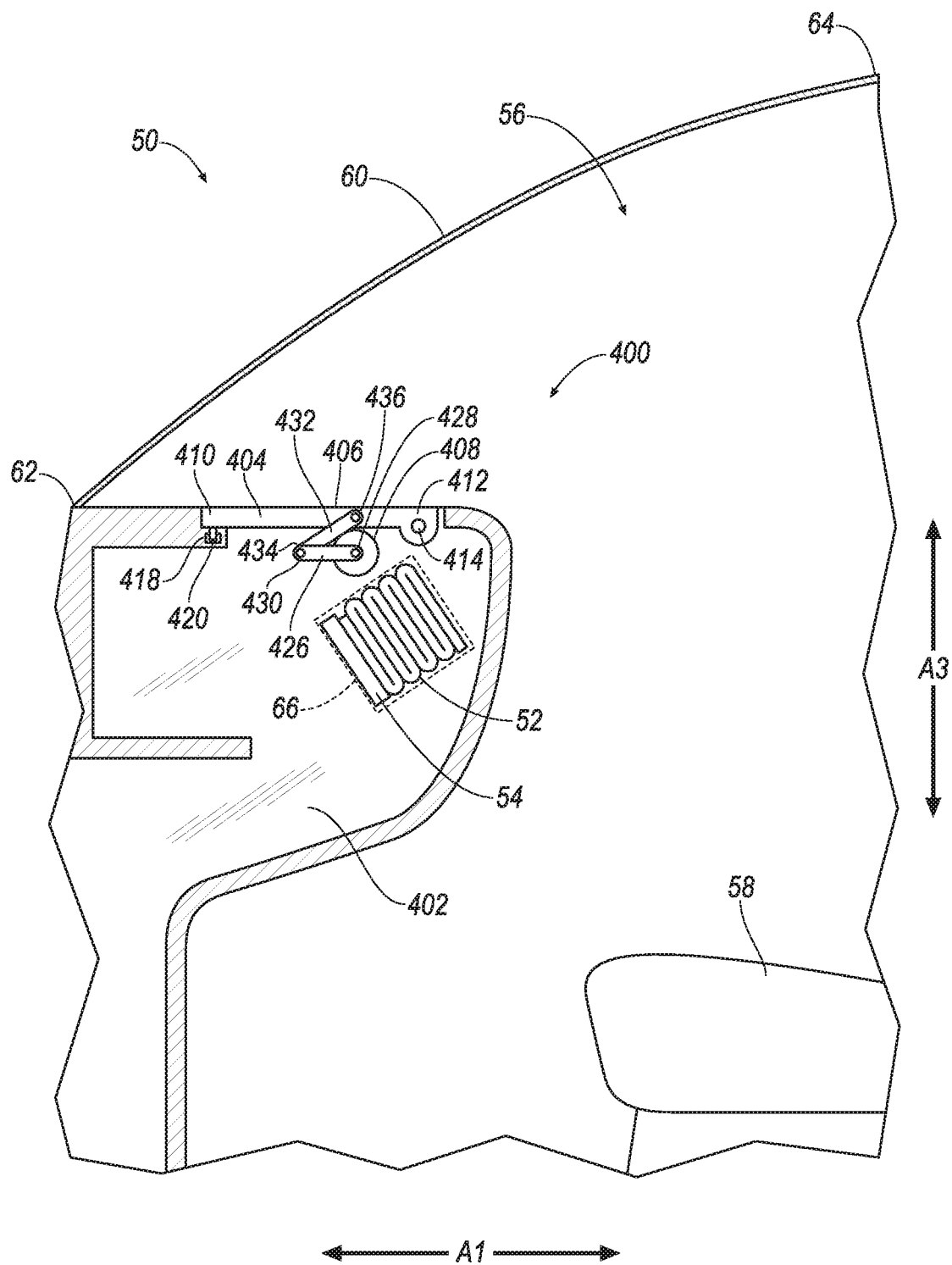
FIG. 12 is a side cross section of the passenger cabin with a body of another example airbag assembly in an undeployed position.
Figure 13:
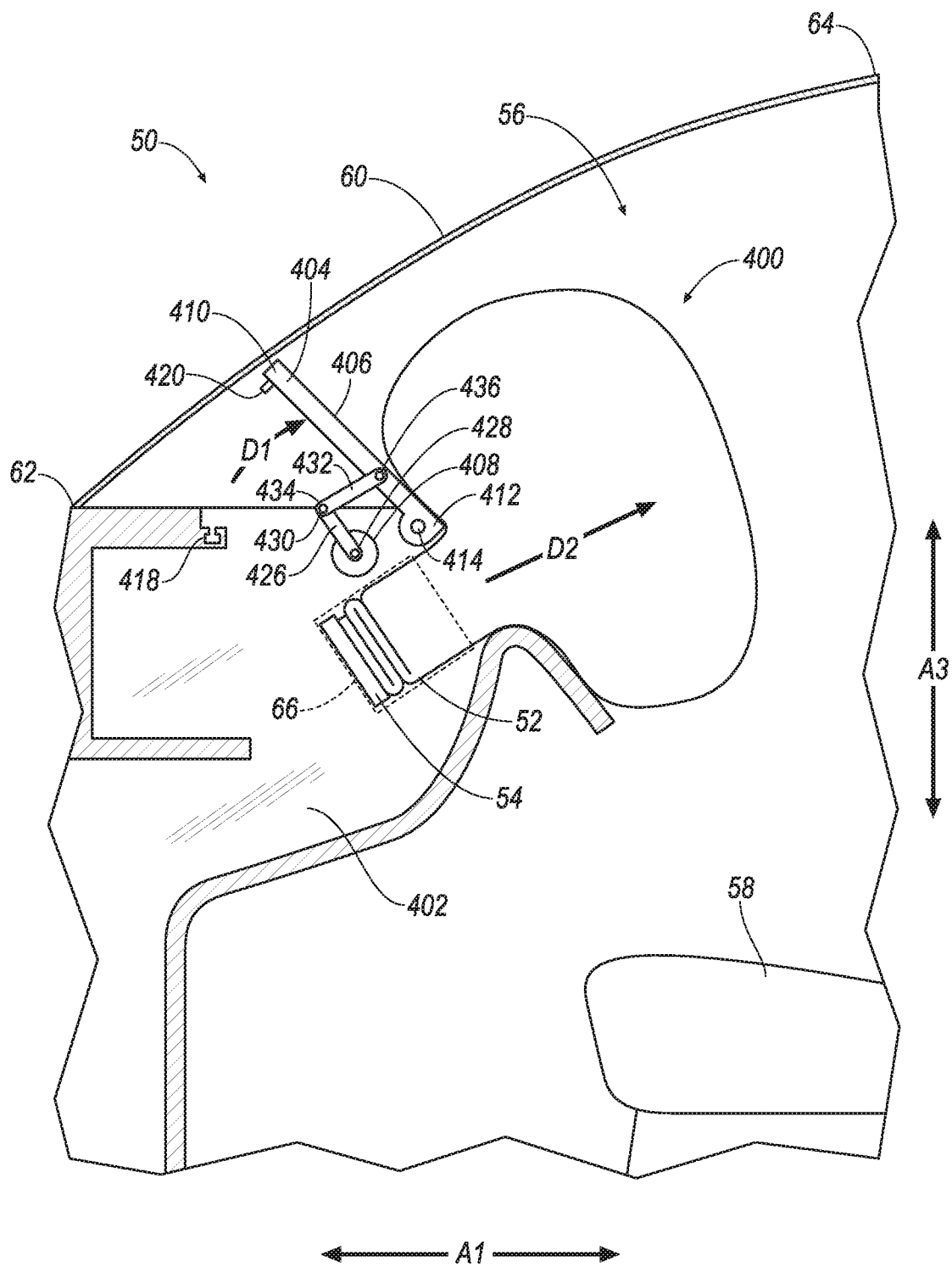
FIG. 13 is a side cross section of the passenger cabin with the body of the example airbag assembly of FIG. 12 in a first deployed position and the airbag in the inflated position.
Figure 14:
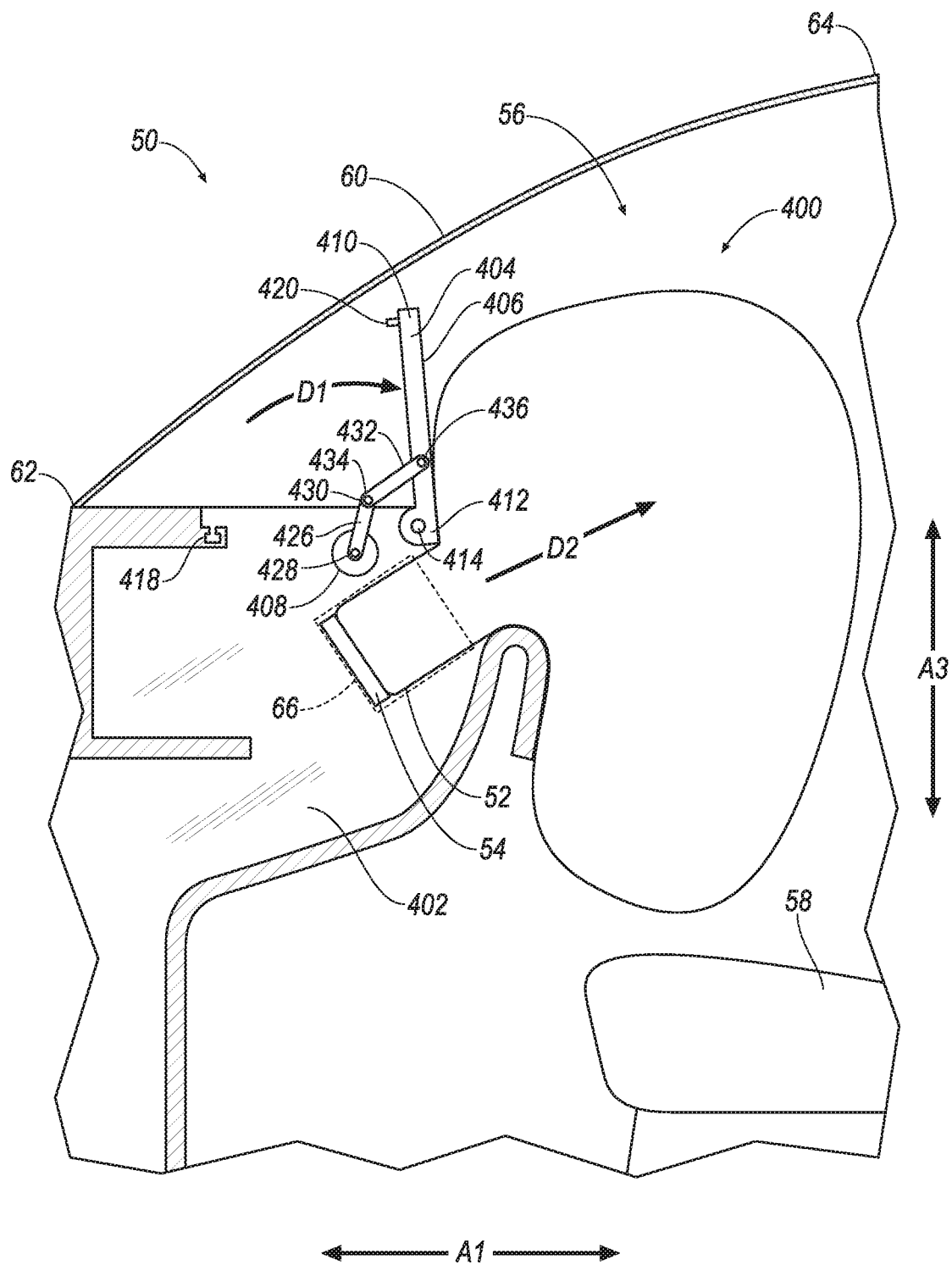
FIG. 14 is a side cross section of the passenger cabin with the body of the example airbag assembly of FIG. 12 in a second deployed position and the airbag in the inflated position.

With reference now the example airbag assembly 400 shown in FIGS. 12-14, the body 404 may be rotatably supported by the front console 402, e.g., to rotate between the undeployed position (shown in FIG. 12), the first deployed position (shown in FIG. 13), and the second deployed position (shown in FIG. 14). For example, the body 404 may include a pin 414 that is rotatably supported in a hole of the front console 402. The pin 414 may be slip fit within the hole, enabling the body 404 to rotate about the pin 414 and relative to the front console 402. The pin 414 may be at the rear of the body 404. In other words, the pin 414 may be closer to the rear end 412 than the front end 410 of the body 404. Other suitable structure that permits rotational movement of the body 404 relative to the front console 402 may be used.

The airbag assembly 400 may include a latch 418 and a latch plate 420 or other suitable engaging structure of the body 404, e.g., as described above for the airbag assembly 100. The latch 418 and latch plate 420 may be at the front of the body 404.

The actuator 408 moves the body 404 between the undeployed position, the first deployed position, and the second deployed position. The actuator 408 may be a rotational actuator that generates torque, e.g., in response to an instruction from the computer 68. For example, the actuator 408 may by a servo motor, a step motor, an electric motor, a hydraulic motor, etc. The actuator 408 may be supported by the front console 402. For example, the actuator 408 may be fixed to the front console 402 via fasteners or other mechanical attachment.

The actuator 408 is operatively coupled to the body 404 such that torque generated by the actuator 408 rotates the body 404 between the undeployed position, the first deployed position and the second deployed position. For example, torque from the actuator 408 may be transferred to the body 404 via a first link 426 elongated between a first end 428 and a second end 430, and a second link 432 elongated between a first end 434 and a second end 436. The first end 428 of the first link 426 may be fixed to a shaft of the actuator 408. The second end 430 of the first link 426 may be rotatably coupled to the first end 434 of the second link 432 such that the first link 426 and the second link 432 may rotate relative to each other at the ends 430, 434. The second end 436 of the second link 432 may be rotatably coupled to the body 404.

Torque from the actuator 408 may rotate the first link 426 at the first end 428 relative to the front console 402, causing the second end 430 of the first link 426 to move upward and rearward, or downward and forward, depending a direction of the torque provided by the actuator 408. Movement of the second end 430 of the first link 426 moves the second link 432. Movement of the second link 432 moves the body 404 to the undeployed position, the first deployed position, or the second deployed position, e.g., depending on a rotational amount and the direction of the shaft of the actuator 408. The airbag 52 system may use other structures to operatively couple the actuator 408 to the body 404 such that the body 404 is moved by actuation of the actuator 408.

The body 404 in the undeployed position is closer to the front edge 62 of the windshield 60 than in the first deployed position and the second deployed position. For example, as the body 404 rotates from the undeployed position to the first deployed position or the second deployed position the front end 410 of the body 404 may move rearward and upward, away from the front edge 62 of the windshield 60. As another example, as the body 404 rotates from the undeployed position to the first deployed position or the second deployed position the front end 410 of the body 404 may move rearward toward the seats 58.

The body 404 in the first deployed position and the second deployed position controls deployment of the airbag 52, e.g., as described above for the bodies 104, 204 of the example airbag assemblies 100, 200.

Figure 15:
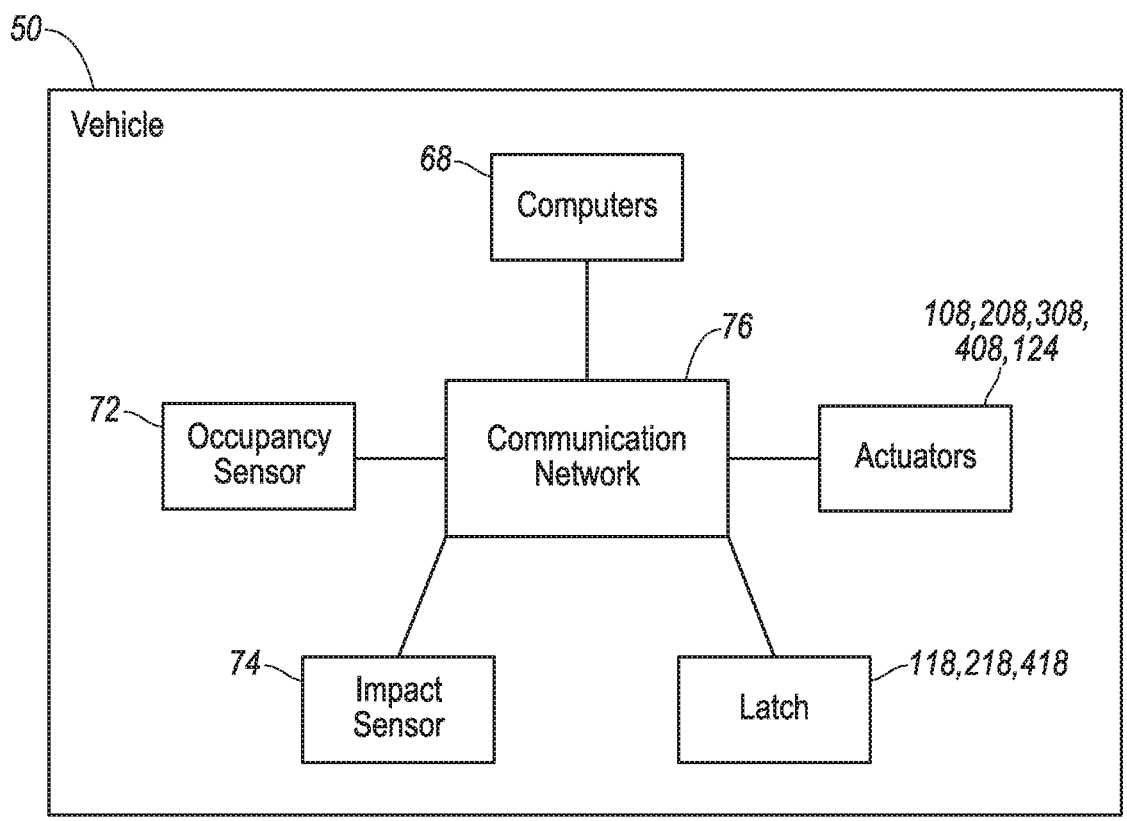
FIG. 15 is a block diagram of components of the vehicle.

With reference to FIG. 15, the vehicle 50 may include an occupancy sensor 72 programmed to detect occupancy of the seat(s) 58. The occupancy sensor 72 may be visible-light or infrared cameras directed at the seat 58, weight sensors, sensors detecting whether a seatbelt for the seat 58 is buckled or unspooled, or other suitable sensors. The occupancy sensor 72 may detect a position of an object in one of the seats 58, e.g., a distance from such object to the front console 102, 202, 302, 402. The occupancy sensor 72 may detect a size, e.g., a weight, height, etc., of such object in one of the seats 58.

The vehicle 50 may include an impact sensor 74. The impact sensor 74 is programmed to detect an impact to the vehicle 50. The impact sensor 74 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 74 may be located at numerous points in or on the vehicle 50.

The vehicle 50 may include a communication network 76. The communication network 76 includes hardware, such as a communication bus, for facilitating communication among vehicle components, e.g., the actuator 108, 208, 308, 408, the occupancy sensor 72, the impact sensor 74, the inflator 54, the computer 68, the latch 118, 218, 418, the actuator 124, etc. The communication network 76 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 68 may be a microprocessor-based computing device implemented via circuits, chips, or other electronic components. For example, the computer 68 may include a processor, memory, etc. The memory of the computer 68 may store instructions executable by the processor as well as data and/or databases.

The memory may store instructions executable by the processor to determine a size of an object in one of the seat 58. For example, the computer 68 may receive information from the occupancy sensor 72 via the communication network 76 and indicating a height, weight, etc., of the object. The computer 68 may compare such information with one or more predetermine thresholds, e.g., to determine if the object is shorter and or lighter than a first threshold, if the object is taller or heavier than the first threshold, if the object is taller or heavier than a second threshold that is greater than the first threshold, etc.

The memory may store instructions executable by the processor to determine an impact to the vehicle 50. For example, the computer 68 may make such determination based on information received from the impact sensor 74 via the communication network 76.

The memory may store instructions executable by the processor to move the body 104, 204, 304, 404 from the undeployed position to the first deployed position and the second deployed position. The computer 68 may move the body 104, 204, 304, 404 to the first deployed position or the second deployed position based on the detected size of the object and upon detecting an impact.

For example, the computer 68 may transmit an instruction via the communication network 76 to the latch 118 instructing the latch 118 to the disengaged position, causing the spring 122 to urge the body 104 to the first deployed position. The computer 68 may additionally transmit an instruction via the communication network 76 to the actuator 124 instructing the actuator 124 to generate torque and rotate in a first direction to move the body 104 to the second deployed position. The computer 68 may disengage the latch 118 from the body 104 before actuating the actuator 124.

As another example, the computer 68 may transmit an instruction via the communication network 76 to the latch 218 instructing the latch 218 to the disengaged position and an instruction via the communication network 76 to the actuator 208 instructing the actuator 208 to increase in length, thereby moving the body 204 to the first deployed position. The computer 68 may disengage the latch 218 from the body 204 before actuating the actuator 208. The computer 68 may additionally transmit an instruction via the communication network 76 to the actuator 208 instructing the actuator 208 to further increase in length, thereby moving the body 204 to the second deployed position.

As a third example, the computer 68 may transmit an instruction via the communication network 76 to the actuator 308 instructing the actuator 308 to increase in length, thereby moving the body 304 to the deployed position.

As a final example, the computer 68 may transmit an instruction via the communication network 76 to the latch 418 instructing the latch 418 to the disengaged position and an instruction via the communication network 76 to the actuator 408 instructing the actuator 408 to generate torque and rotate in a first direction, thereby moving the body 404 to the first deployed position. The computer 68 may disengage the latch 418 from the body 404 before actuating the actuator 408. The computer 68 may additionally transmit an instruction via the communication network 76 to the actuator 408 instructing the actuator 408 to further generate torque and rotate in the first direction, thereby moving the body 404 to the second deployed position.

The memory may store instructions executable by the processor to move the body 104, 204, 304, 404 from the first deployed position or the second deployed position to the undeployed position. For example, the computer 68 may transmit an instruction via the communication network 76 to the actuator 208, 308, instructing the actuator 208, 308 to retract. As another example, the computer 68 may transit an instruction via the communication network 76 to the actuator 124, 408 instructing the actuator 124, 408 to generate torque and rotate in a second direction that is opposite the first direction.

Figure 16:
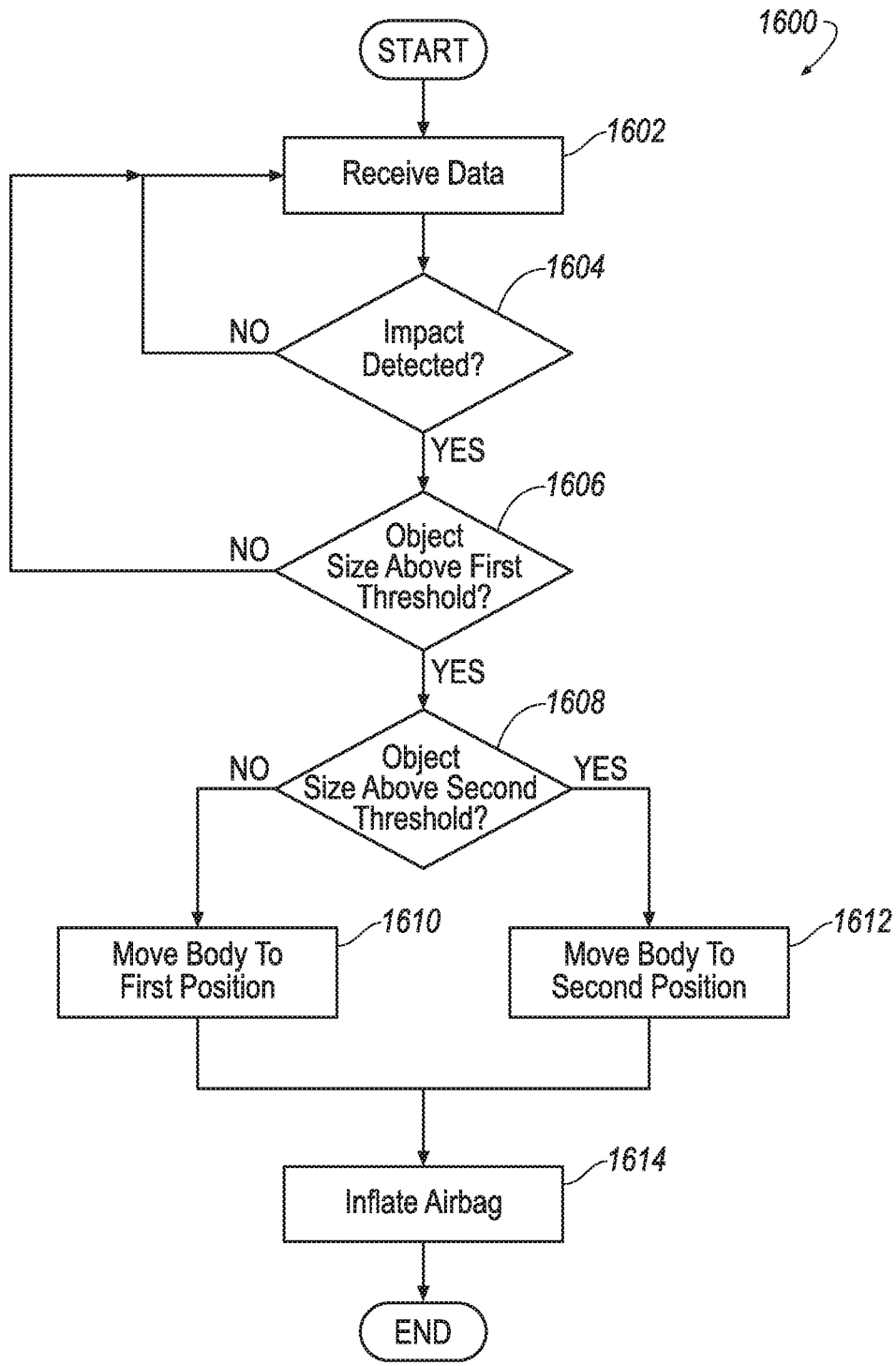
FIG. 16 is a flow chart illustrating a process for controlling the vehicle having the airbag assembly.

FIG. 16 is a process flow diagram illustrating an exemplary process 1600 for controlling the airbag assembly 100, 200, 300, 400. The process 1600 begins in a block 1602 where the computer 68 receives data, e.g., from the occupancy sensor 72, the impact sensor 74, etc., via the communication network 76. The computer 68 may continue to receive data throughout the process 1600. Throughout the process 1600 in the present context means substantially continuously or at time intervals, e.g., every 10 milliseconds.

Next at a block 1604 the computer 68 determines whether a vehicle impact has been detected, e.g., based on information received from the impact sensor 74 via the communication network 76. Upon determination that a vehicle impact has not been detected the process 1600 returns to the block 1602. Upon determination that a vehicle impact has been detected the process 1600 moves to a block 1606.

At the block 1606 the computer 68 determines whether a size of an object in the seat 58 is above a first threshold, e.g., based on information received from the occupancy sensor 72 via the communication network 76. Upon determination that the size is not above the first threshold the process 1600 returns to the block 1602, alternatively the process 1600 may end. Upon determination that the size is above the first threshold the process 1600 moves to a block 1608.

At the block 1608 the computer 68 determines whether the size of an object in the seat 58 is above a second threshold that is greater than the first threshold, e.g., based on information received from the occupancy sensor 72 via the communication network 76. Upon determination that the size is not above the second threshold the process 1600 moves to a block 1610. Upon determination that the size is above the first threshold the process 1600 moves to a block 1612.

At the block 1610 the computer 68 moves the body 104, 204, 304, 404 to the first position, e.g., by transmitting instructions via the communication network 76 to the actuator 108, 208, 308, 408 and/or the latch 118, 218, 418, e.g., as described herein. After the block 1610 the process 1600 moves to the block 1614.

At the block 1612 the computer 68 moves the body 104, 204, 304, 404 to the second position, e.g., by transmitting an instruction via the communication network 76 to the actuator 108, 208, 308, 408, the actuator 124, and/or the latch 118, 218, 418, e.g., as described herein. After the block 1612 the process 1600 moves to the block 1614.

At the block 1614 the computer 68 inflates the airbag 52, e.g., by transmitting an instruction via the communication network 76 to the inflator 54 instructing the inflator 54 to provide inflation medium to the airbag 52. After the block 1614 the process 1600 may end.

Although certain features have been described with relation to only one of the examples disclosed herein, such features may be included in the other examples.

With regard to the process 1600 described herein, it should be understood that, although the steps of such process 1600. have been described as occurring according to a certain ordered sequence, such process 1600 could be practiced with the described steps performed in an order other than the order described herein. It further should be understood that certain steps could be performed simultaneously, that other steps could be added, or that certain steps described herein could be omitted. In other words, the description of the process 1600 herein is provided for the purpose of illustrating certain embodiments and should in no way be construed so as to limit the disclosed subject matter.

Computing devices, such as the computer 68, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a front console;
   a body having a reaction surface and supported by the front console;
   a linear actuator connected to the body, the body translatable by the linear actuator away from the front console from an undeployed position to a deployed position above the front console;
   an airbag supported by the front console and inflatable to an inflated position that abuts the reaction surface; and
   an inflator connected to the airbag.

2. The assembly of claim 1, wherein the body is rotatable from the undeployed position to the deployed position.

3. The assembly of claim 1, wherein the linear actuator includes a pyrotechnic device.

4. The assembly of claim 1, wherein the body is movable by the linear actuator to a second deployed position.

5. The assembly of claim 1, wherein the body is moveable to the deployed position in a first direction, and the airbag is inflatable in a second direction transverse to the first direction.

6. The assembly of claim 1, further comprising a second body supported by the front console and moveable to a deployed position, and a second actuator connected to the second body to move the second body to the deployed position.

7. A vehicle, comprising:
   a windshield;
   a front console;
   an airbag supported by the front console below the windshield and inflatable to an inflated position;
   an inflator connected to the airbag;
   a body supported by the front console;
   an actuator connected to the body, the body moveable by the actuator toward the windshield to a deployed position between the windshield and the airbag in the inflated position; and
   a processor and a memory storing instructions executable by the processor to:
      command the actuator to move the body to the deployed position upon detecting an impact; and
      disengage a latch from the body before actuating the actuator.

8. The vehicle of claim 7, wherein the memory stores instructions to inflate the airbag after actuating the actuator.

9. The vehicle of claim 7, wherein the body is movable from an undeployed position that is further from the windshield than the deployed position.

10. The vehicle of claim 7, wherein the body is movable from an undeployed position that is closer to a front edge of the windshield than the deployed position.

11. The vehicle of claim 7, wherein the body includes a class-A surface.

12. The vehicle of claim 7, wherein the actuator is a linear actuator.

13. The vehicle of claim 7, wherein the body is rotatable from an undeployed position to the deployed position.

14. The vehicle of claim 7, wherein the body is translatable from an undeployed position to the deployed position.

* * * * *